Dec. 9, 1969    W. KAFKA    3,483,493
SUPERCONDUCTING MAGNET COILS
Filed July 24, 1964    2 Sheets-Sheet 2

United States Patent Office 3,483,493
Patented Dec. 9, 1969

3,483,493
SUPERCONDUCTING MAGNET COILS
Wilhelm Kafka, Tennenlohe, Germany, assignor to Siemens Aktiengesellschaft, a corporation of Germany
Filed July 24, 1964, Ser. No. 384,890
Claims priority, application Germany, July 27, 1963,
S 86,400
Int. Cl. H01f 7/22
U.S. Cl. 335—216                                     14 Claims

ABSTRACT OF THE DISCLOSURE

Superconductors in a magnet coil which extend in the direction perpendicular to the coil axis are given a finite resistance. The detrimental circulating current in its path extending traverse to the coil current proper must overcome a finite resistance which causes it to be rapidly attenuated. As a result, the current-carrying capacity of the superconducting coil can be increased.

My invention relates to superconducting magnet coils. More particularly, my invention relates to magnet coils of superconducting materials for operation at cryogenic temperatures.

Coils of hard superconductors for high magnetic field strengths exhibit the phenomenon that the coil wire converts to normal-conducting state at a much lower current density than corresponds to measuring results made with short-wire pieces of the same material. This phenomenon, called coil or proximity effect, is due to the formation of circulating currents which are induced by penetration of the coil field into the hard superconductor. The circulating currents are superimposed upon the coil current, thus causing the superconductor to prematurely convert to normal conductance. This prevents full utilization of the superconducting material and thereby increases the cost of such coils.

It is an object of my invention to prevent or greatly minimize such undesired phenomena by effectively counteracting the occurrence of circulating currents.

In accordance with the present invention, those superconductors in a magnet coil which extend in the direction perpendicular to the coil axis are given a finite resistance. Thus the detrimental circulating current in its path extending transverse to the coil current proper must overcome a finite resistance which causes it to be rapidly attenuated. As a result, the current-carrying capacity of the superconducting coil can be increased.

Before describing specific embodiments of the invention, it is helpful to describe the occurrence and distribution of circulating currents in a superconducting coil winding.

In order that the present invention may be readily carried into effect, it will now be described with reference to the accompanying drawings, wherein.

Figure 1:
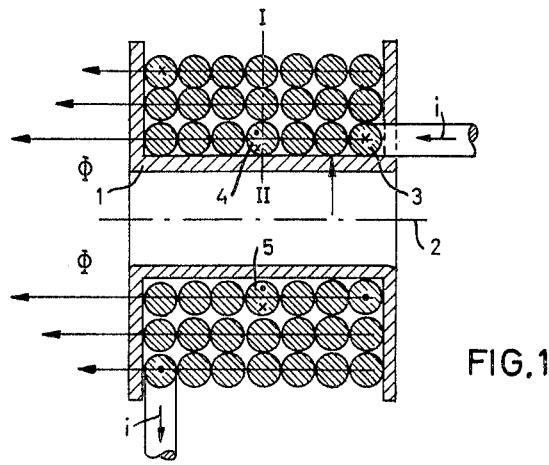
FIG. 1 is a schematic lateral section of an embodiment of a superconducting magnet coil.

FIG. 1 shows three layers of a tubular winding wound upon a spool body 1. The coil current $i$ in the current supply leads flows in a direction indicated by arrows and passes clockwise through the turns of the coil with respect to the coil axis 2. This is schematically indicated for one of the turns 3 by a dot, which indicates a current flow substantially perpendicularly from the plane of illustration toward the observer, and by an $x$, which indicates a current flow from the observer substantially perpendicularly into the plane of illustration.

The coil current produces a magnetic field $\phi$, which traverses the interior of the coil as well as the superconducting turns in the direction of the long horizontal arrows, from right to left. The different respective lengths of the arrows approximately indicate relative strengths of the magnetic field at the particular localities; the field strength being assumed to be constant at any fixed distance from the coil axis 2.

When the magnetic field is being built up, a circulating current is induced, which, according to Lenz's Law, tends to act in opposition to its producing field and consequently functions to weaken the magnetic field $\phi$. The circulating current, as indicated in turn 4, 5 of FIG. 1, is thus so directed that it flows in opposition to the coil current $i$ in the outer half portion of the conductor farther from the coil axis 2, but flows in the same direction as the coil current $i$ in the inner half portion of the conductor closer to the coil axis. This occurs in the other turns also. The circulating current is superimposed upon the coil current $i$ and may result in a premature and undesired transition of the superconductor to the state of normal conductance in the inner half portions closer to the coil axis.

Figure 2:
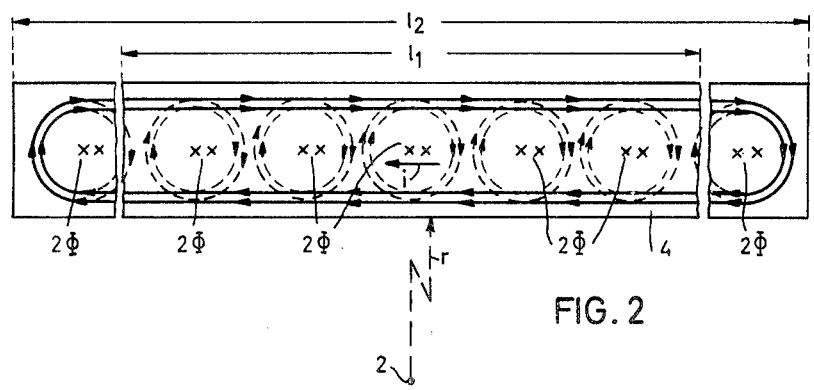
FIGS. 2 and 3 are schematic indications of a section of a conductor of the coil of FIG. 1.

FIG. 2 illustrates a section through a piece of conductor 4 having a length $l_1$ along the line I–II of FIG. 1. FIG. 2 is on such a large scale that the radical distance $r$ of the inner edge of the conductor 4 from the coil axis 2 of FIG. 1 can be shown in FIG. 2 only greatly foreshortened and the illustrated piece of conductor can be looked upon as being substantially straight.

The illustrated piece of conductor is traversed by a flux $\phi$ assumed to be substantially constant. Consequently, the circulating currents induced by the flux flow in the indicated direction. That is, in the inner half of the conductor the circulating currents have the same direction as the coil current $i$, whereas in the outer half of the conductor the circulating currents are opposed to the coil current $i$.

In the conductor piece $l_1$ the circulating currents, schematically indicated by broken lines, compensate each other so that the resultant circulating current is distributed only on the periphery of the conductor and traverses the conductor in the transverse direction at the beginning and at the end respectively of the field distribution assumed to be constant. Consequently, the resultant circulating current is distributed at the beginning and at the end of the conductor piece $l_2$, whose length would correspond to the innermost layer in developed form. If, in accordance with the present invention, the superconductor possesses finite resistance in the transverse direction, then the resulting circulating current can be attenuated in the transverse flow paths.

Figure 3:
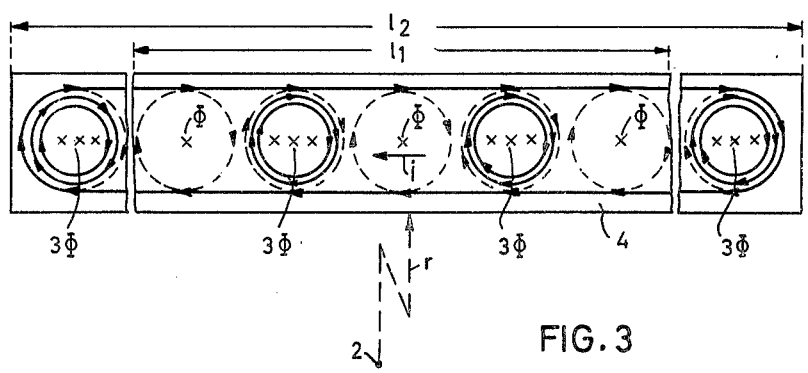

FIG. 3 illustrates a piece of conductor corresponding to that of FIG. 2, except that the strength of the coil field passing through the conductor piece $l_1$ of FIG. 3 is not assumed to be constant. This is schematically indicated by respectively different numbers of the field lines per unit length indicated by $x$.

In the illustrated piece of conductor of FIG. 3, the circulating currents, represented by broken lines, which flow in mutually opposed directions, will cancel each other so that the full-line distribution of circulating current will result. It will be recognized that between each two localities at which the field strength has respectively different amounts, a circulating current must flow in the transverse direction of the conductor. The magnitude of the circulating current flowing in this transverse path depends upon the local difference in field strengths.

While by constant field distribution the current traverses the conductor in the transverse direction only at the begining and at the end of the conductor there flows current in the transverse direction at several points when the magnetic field distribution is inconstant. The finite resistance in the transverse direction may here be of efficiency at several points. The circulating currents are more attenuated than in the first case. FIGS. 4 to 8 and 12 show how to obtain an inhomogeneous field in the conductor of a coil.

Figure 4:
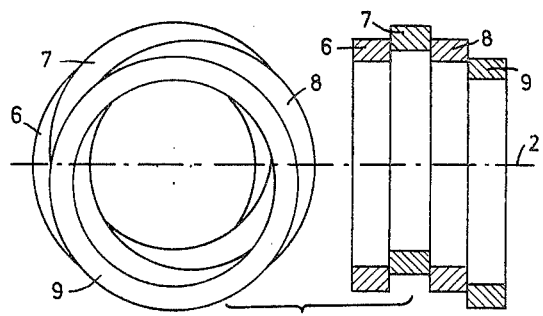
FIG. 4 is a perspective view and a lateral section of an embodiment of the superconducting magnet coil of the present invention.
Figure 5:
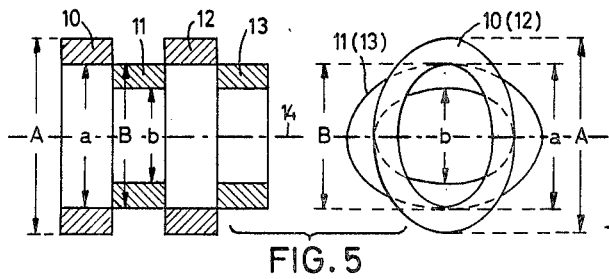
FIG. 5 is a lateral section and a perspective view of a modification of the embodiment of FIG. 4.

In FIG. 4, a plurality of hollow cylindrical winding turns 6, 7, 8 and 9 are positioned axially adjacent each other. The axes of adjacent ones of the cylindrical windings are noncoincident. In contrast to a conventional symmetrical tubular winding, the staggered winding of the embodiment of FIG. 4 has the peculiarity that the magnetic field is not constant along the periphery of each individual turn and that circulating currents in the transverse direction will be induced. The same situation is created in the windings of FIGS. 5 and 6. FIG. 5 shows coaxial winding turns which individually have an approximately elliptical shape. Adjacent ones of the turns are angularly displaced 90° from each other about their axis 14. Since the coil field generally decreases with increasing distance from the coil axis 14, the magnetic field traversing the superconductor changes twice along the periphery of a turn from a maximum value to a minimum value and vice-versa.

When identical turns are utilized, it is of advantage to design the elliptical shapes so that the largest inner diameter is equal to the smallest outer diameter. In such a design, $a=B$ and results in securing the largest possible difference between the maximum and minimum field strengths with a most compact spacial shape of the coil. If desired, however, the coil turns may also be designed with elliptical shapes whose respective main axes are different from the dimensional relation described.

Figure 6:
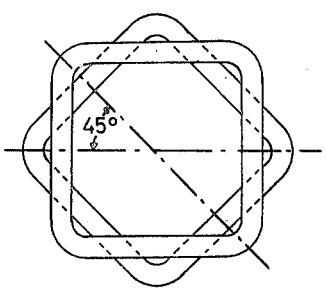
FIG. 6 is a perspective view of another modification of the embodiment of FIG. 4.

FIG. 6 is a modification of the coil of FIG. 5, in which the coaxially arranged winding turns have a substantially square perimetric shape and are angularly displaced 45° from each other about their axis.

Figure 7:
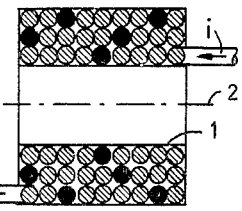
FIG. 7 is a lateral section of another embodiment of the superconducting magnet coil of the present invention.
Figures 8, 9, 10:
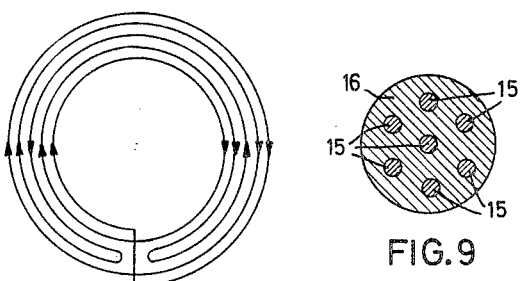
FIG. 8 is a schematic presentation explaining the operation of the embodiment of FIG. 7.
FIG. 9 is an axial section of an embodiment of a portion of the superconducting magnet coil of the present invention.
FIG. 10 is a lateral section of another embodiment of a portion of the superconducting magnet coil of the present invention.

FIG. 7 illustrates an embodiment in which the difference in field strength between adjacent coil turns is produced in a tubular winding. In FIG. 7, a coil of superconducting wires is wound upon a spool 1. Every four winding turns are wound in the same sense and are followed by a winding turn wound in the opposite sense, as schematically indicated in FIG. 8. Where the windings are reversed, the field, otherwise approximately constant per layer, is weakened, and the difference in field strength causes a greater part of the circulating currents to flow in the conductor transverse direction.

Figure 12:
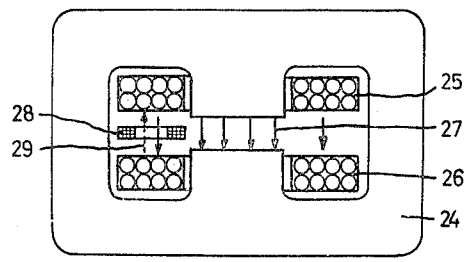
FIG. 12 is a view, partly in section, of another embodiment of the superconducting magnet coil of the present invention.

Another manner, in accordance with the invention, of providing for spacially limited field weakening is to equip one or more localities of the coil periphery with additional auxiliary coil windings. The auxiliary coil windings are energized by a separate current or the same current as the main coil so that the magnetic field produced by the auxiliary coils traverse the conductors of the magnet coil in the sense opposed to that of the field of the magnet coil itself. This is shown in FIG. 12. In FIG. 12, an iron core 24 carries two superconducting coils 25 and 26, which are traversed by a current flowing in such a direction that a magnetic field 27 is created which is directed as indicated by the arrows. To limit the local magnetic field, an auxiliary coil 28 is provided. The auxiliary coil 28 is excited in a manner which directs its magnetic field 29 opposite to the main magnetic field.

In each of the embodiments described, the geometric features are such that the resistance of the superconductors in a direction transverse to the axis of the coil is made as large as feasible so that circulating currents occurring in the transverse direction may be eliminated as rapidly as possible. Such superconductors may be produced, for example, by jacketing a plurality of hard superconductors with poorly conducting metal alloys, or by embedding the superconducting material in jackets of low conductance and thereafter drawing the jacketed conductor to a thin wire. FIG. 9 illustrates such a superconductor.

In FIG. 9 the individual superconducting component wires 15 are embedded in and surrounded by a metal alloy 16 of poor or normal conductance. The wire assembly may be twisted in itself, or about an axis, and it may then be wound in the conventional manner to form a coil, or it may be used in any of the embodiments of a coil of FIGS. 4 to 8.

Another manner of providing a superconductor which assures reduced or minimum formation of circulating currents is schematically illustrated in FIG. 10. In FIG. 10, one or both sides of a foil of resistance material are provided with superconducting layers. The superconducting material in this case, as well as in all of the embodiments of the invention described herein, may consist of niobium tin (NbSn), niobium-zirconium (NbZr), niobium-titanium (NbTi) or vandium-gallium.

Figure 11:
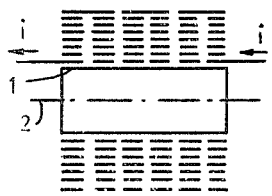
FIG. 11 is a schematic presentation explaining the utilization of the embodiment of FIG. 10.

In FIG. 10, five superconducting layers 17 to 21 are placed above one another with foils 22 of resistance material interposed. The entire assembly is surrounded by insulation 23 which also imparts to the assembly the necessary mechanical strength. Such laminated conductors are not wound into layers but are mounted in stacks of which each extends perpendicular to the coil axis 2, as is schematically indicated in FIG. 11. The foil conductors are also applicable for producing coil windings of the type shown in FIGS. 4, 5 and 6.

Superconductors which exhibit minimum circulating currents may also be formed of stacks of packages comprising thin foils which consist of pure metals such as titanium, niobium or vanadium and which are alloyed at their surfaces with other metals to form hard superconducting coatings. The foils are then separated from each other by intermediate layers of semiconductors or poor conductors such as, for example, graphite powder.

An entire stack of foils may be placed one above another and then insulated by an envelope in the same manner as the embodiment of FIG. 10. The assembly may then be wound in a coil like an individual conductor. It is then also preferable to have the superconductor repeatedly pass through a coil field of alternately high and low strengths in order to cause the circulating current to traverse the poorly conducting intermediate layer as often as feasible.

Figure 13:
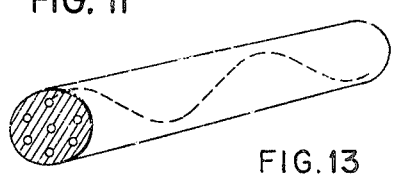
FIG. 13 is a schematic presentation partly in section, of another embodiment of the present invention.

In the embodiment of FIG. 13, the superconducting magnet coil comprises a plurality of turns of a conductor twisted in itself and comprising a material of normal electrical conductance and a plurality of superconducting wires embedded in the material.

I claim:

1. A susperconducting magnet coil having an axis and comprising a plurality of turns, each turn having with the superconducting coil a finite resistance in a direction perpendicular to the axis of said coil, said coil having a configuration such that said turns pass alternately in short sequence through a stronger and a weaker magnetic field, said turns being adjacent each other in the direction of the axis of said coil.

2. A superconducting magnet coil having an axis and comprising a plurality of turns of hollow substantially cylindrical configuration having a finite resistance in a direction perpendicular to the axis of said coil, said turns being positioned adjacent each other in the direction of the axis of said coil, adjacent ones of said turns having noncoincident axes.

3. A superconducting magnet coil having an axis and comprising a plurality of turns of ovular configuration having a finite resistance in a direction perpendicular to the axis of said coil, said turns being positioned adjacent each other in the direction of the axis of said coil and having a common axis coincident with said axis of said coil, adjacent ones of said turns being angularly displaced from each other about said axis.

4. A superconducting magnet coil having an axis and comprising a plurality of turns of polygonal configuration having a finite resistance in a direction perpendicular to the axis of said coil, said turns being positioned adjacent each other in the direction of the axis of said coil and having a common axis coincident with said axis of said coil, adjacent ones of said turns being angularly displaced from each other about said axis.

5. A superconducting magnet coil comprising a plurality of coaxial superimposed layers, each of said layers having a plurality of turns wound in the same sense followed by a turn wound in the opposite sense.

6. A superconducting magnet coil comprising a plurality of turns of a conductor twisted in itself and comprising a material of normal electrical conductance and a plurality of superconducting wires embedded in said material.

7. A superconducting magnet coil comprising a plurality of turns of a conductor comprising a plurality of substantially parallel superconductors spaced from each other and electrical resistance material interposed between said superconductors.

8. A superconducting magnet coil comprising a plurality of turns of a conductor comprising a plurality of substantially parallel superconducting layers spaced from each other and foils of poor electrical conducting material interposed between said superconducting layers.

9. A superconducting magnet coil component as claimed in claim 8, wherein said poor electrical conducting material is graphite powder.

10. A superconducting magnet coil comprising a plurality of turns for providing a magnetic field in a determined direction and auxiliary coil means for providing a magnetic field opposed to said determined direction and passing through said turns.

11. A superconducting magnet coil having an axis and comprising a plurality of turns of ovular configuration having a finite resistance in a direction perpendicular to the axis of said coil, said turns being positioned adjacent each other in the direction of the axis of said coil and having a common axis coincident with said axis of said coil, adjacent ones of said turns being angularly displaced 90° from each other about their axis.

12. A superconducting magnet coil having an axis and comprising a plurality of turns of substantially elliptical configuration having a finite resistance in a direction perpendicular to the axis of said coil, said turns being positioned adjacent each other in the direction of the axis of said coil and having a common axis coincident with said axis of said coil, adjacent ones of said turns being angularly displaced 90° from each other about their axis.

13. A superconducting magnet coil having an axis and comprising a plurality of turns of polygonal configuration having finite resistance in a direction perpendicular to the axis of said coil, said turns being positioned adjacent each other in the direction of the axis of said coil and having a common axis coincident with said axis of said coil, adjacent ones of said turns being angularly displaced 45° from each other about their axis.

14. A superconducting magnet coil having an axis and comprising a plurality of turns of substantially square configuration having a finite resistance in a direction perpendicular to the axis of said coil, said turns being positioned adjacent each other in the direction of the axis of said coil and having a common axis coincident with said axis of said coil, adjacent ones of said turns being angularly displaced 45° from each other about their axis.

References Cited

UNITED STATES PATENTS

| | | |
|---|---|---|
| 3,366,728 | 1/1968 | Garwin et al. |
| 3,173,079 | 3/1965 | McFee. |
| 3,187,235 | 6/1965 | Berlincourt et al. |
| 3,255,335 | 6/1966 | Kortelink. |
| 3,257,587 | 6/1966 | Karfft. |

OTHER REFERENCES

Journal of Applied Physics, vol. 33, No. 12, December 1962, pp. 3499–3503.

GEORGE HARRIS, Primary Examiner

U.S. Cl. X.R.

338—32